June 7, 1932.  F. N. GRANT  1,862,081
LIFTING HOOK
Filed Jan. 22, 1932
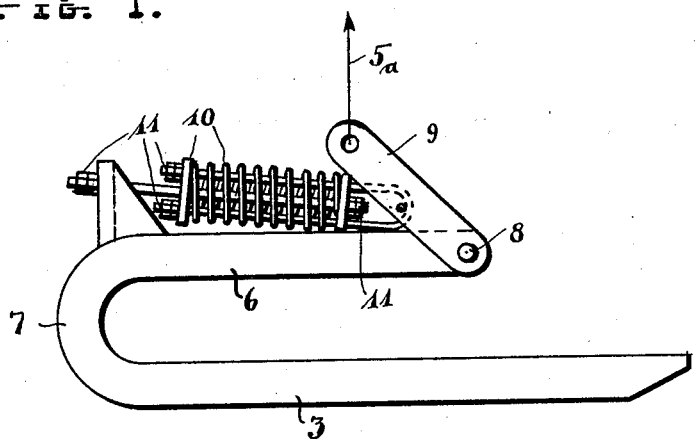
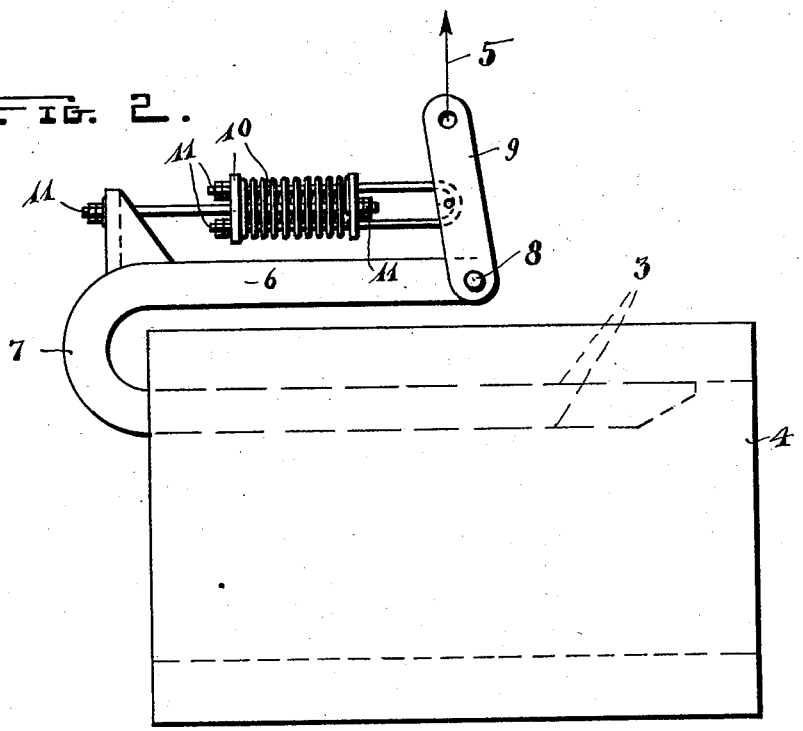
INVENTOR:
Floyd N. Grant,
By:- Otto H. Kugler,
his Atty.

Patented June 7, 1932

1,862,081

UNITED STATES PATENT OFFICE

FLOYD N. GRANT, OF SOUTH GATE, CALIFORNIA, ASSIGNOR TO AMERICAN CONCRETE AND STEEL PIPE COMPANY, OF SOUTH GATE, CALIFORNIA

LIFTING HOOK

Application filed January 22, 1932. Serial No. 588,106.

This invention relates to devices used for lifting and handling objects in a certain level or desirably suspended position.

One of the objects of this invention is to provide a support especially designed to hold heavy concrete or other pipes with their axes in a practically horizontal or desirably disposed line to facilitate the placing and joining of such pipes with others in a trench or other place.

Another object is to provide an attachment by which such a support is automatically held so disposed in empty or loaded position.

Other objects will appear from the following description and appended claims as well as from the accompanying drawing, in which—

Fig. 1 is a side elevation of a simple hook in a position which it will assume when not loaded.

Fig. 2 is a side elevation of the same hook illustrated in Fig. 1 in a position to which it will be forced by a load supported by the hook.

In handling a pipe section, especially in placing the section into a connecting or an adjoining position with respect to another already existing or placed section, it is essential that the newly placed section be held in readiness to easily slip into engaging or connecting position as soon as brought into proper alignment with the existing section.

On the other hand, the hook itself, too, especially for handling a heavy pipe, is of considerable weight and difficult to manage without risk of injury if not in a position to readily slip into proper place for supporting such a pipe.

As illustrated in the drawing, the lifting hook according to this invention is provided with one supporting shank 3 designed to slip into the inside of a pipe-section, indicated at 4 in Fig. 2, so that the pipe-section can be suspendedly supported by the hook with the axis of the pipe in a practically horizontal position.

Inasmuch as the center of gravity of a symmetrically designed pipe would be approximately at the middle of the length of the pipe in the line of its central axis, the support by the hook should also be approximately at the middle of the pipe, preferably above the axis referred to, as indicated by the arrow 5, disregarding for a moment any unsymmetric arrangement of the weights of material in the hook.

The hook illustrated here, however, is provided with an upper shank-portion 6 of comparatively shorter length than the portion or shank 3, both shanks being connected by a doubled-up portion or bend 7, and a pivot 8 being provided at the free end of the upper shank by which supporting means are applied.

From the illustration in Fig. 2 it must be clear that the line of attack or support could be said to cross the upper shank 6 rather close to the pivot 8 when the hook is loaded down by a supported pipe; while, from the illustration in Fig. 1, it is obvious that the line of attack or support, indicated at $5_a$ is considerably further to the left of the pivot 8 when the hook is not loaded down, favorably disposed towards the center of gravity of the hook itself, whereby the hook can be maintained with its shank 3 in a suitable position to readily align with the inside of a pipe.

This result is obtained by a link 9, connected to the pivot 8, and controlled by a spring-mechanism 10. The spring-mechanism is provided with several adjustments whereby the tension of the spring can be controlled in such a manner that the line of attack or support is brought into alignment with the center of gravity of the hook itself when unloaded and into alignment with the center of gravity of the combined weights of a supported pipe and the hook in loaded position.

Of course, springs of different strength can be provided to take care of extremely different weights of pipes, though the adjustments at 11 should generally be sufficient.

Furthermore, inasmuch as pipes are frequently placed with their axes in an incline, it must also be understood that the tension of the spring can be adjusted so as to lift, hold, and align a pipe-section so as to readily align with a previously placed pipe-section.

Having thus described my invention, I claim:

1. In a lifting hook, a supporting member bent upon itself forming a lower shank adapted to slip into a pipe and an upper shank comparatively shorter than the lower shank and having a pivot at its end, and a spring-controlled link with one end pivotally connected to said pivot and a free end adapted to swing into alignment with the center of gravity of the hook when unloaded and also adapted to swing into alignment with the combined center of gravity of the hook and a pipe supported by the hook.

2. A laterally open lifting hook having a spring-controlled link by which the hook is supported, the spring-control applying laterally to the link in the opposite direction to the lateral opening of the hook.

In testimony that I claim the foregoing as my invention I have signed my name.

FLOYD N. GRANT.